(12) United States Patent
Soloviev

(10) Patent No.: US 7,995,607 B2
(45) Date of Patent: Aug. 9, 2011

(54) ARBITER FOR A SERIAL BUS SYSTEM

(75) Inventor: Vassily Soloviev, St. Petersburg (RU)

(73) Assignee: Freescale Semiconductor, Inc., Austin, TX (US)

( * ) Notice: Subject to any disclaimer, the term of this patent is extended or adjusted under 35 U.S.C. 154(b) by 873 days.

(21) Appl. No.: 11/568,405

(22) PCT Filed: Apr. 28, 2004

(86) PCT No.: PCT/RU2004/000166
§ 371 (c)(1), (2), (4) Date: Jan. 5, 2007

(87) PCT Pub. No.: WO2005/107175
PCT Pub. Date: Nov. 10, 2005

(65) Prior Publication Data
US 2007/0223376 A1    Sep. 27, 2007

(51) Int. Cl.
*H04L 12/413* (2006.01)
(52) U.S. Cl. .......... 370/462; 370/461; 710/119
(58) Field of Classification Search .......... 710/113, 710/119
See application file for complete search history.

(56) References Cited

U.S. PATENT DOCUMENTS

| | | | | |
|---|---|---|---|---|
| 4,205,390 | A * | 5/1980 | Sakurai et al. | 711/220 |
| 4,232,294 | A * | 11/1980 | Burke et al. | 370/444 |
| 5,241,601 | A * | 8/1993 | Naito et al. | 370/447 |
| 5,418,920 | A * | 5/1995 | Kuddes | 711/106 |
| 5,509,125 | A * | 4/1996 | Johnson et al. | 710/120 |
| 5,968,154 | A | 10/1999 | Cho | |
| 6,339,302 | B1 * | 1/2002 | Greenbank et al. | 318/103 |
| 6,467,002 | B1 | 10/2002 | Yang | |
| 6,629,220 | B1 | 9/2003 | Dyer | |
| 6,957,290 | B1 * | 10/2005 | Rowlands et al. | 710/240 |
| 2002/0129181 | A1 * | 9/2002 | Lahiri et al. | 710/113 |

FOREIGN PATENT DOCUMENTS

GB    2165726 A  *  4/1986

OTHER PUBLICATIONS

Robert Bosch; CAN Specification Version 2.0; 1991; Postfach 50; D-7000; Stuttgart 1.
Hermann Kopetz; The Time-Triggered Architecture; 2003; IEEE.

* cited by examiner

*Primary Examiner* — Huy D Vu
*Assistant Examiner* — Benjamin Lamont

(57) ABSTRACT

An arbiter for a device arranged to be coupled to a serial bus, the arbiter comprising a means for obtaining identifier information associated with one more other devices coupled to the serial bus and; means for determining a priority level based upon an identifier associated with the device and identifier associated with one of the other devices.

9 Claims, 2 Drawing Sheets

ARBITER FOR A SERIAL BUS SYSTEM

Communication buses, for example a serial bus, are commonly used to allow two or more remotely located devices to communicate. To resolve, or avoid, collisions on the bus, for example due to two or more devices attempting to transmit messages at the same time, arbitration protocols are utilized. Arbitration protocols are typically used to establish a priority order among the devices connected to the bus, where bus access is granted to the device having the highest priority among the devices requesting bus access.

To allow an arbitration protocol to determine the relevant priority levels associated with devices coupled to a bus a priority scheme is typically utilized, where a distributed priority scheme requires that a priority value be assigned to each device connected to the bus. A distributed priority scheme can be classified as either a fixed priority scheme or floating priority scheme.

A fixed priority scheme requires that every device connected to a bus be assigned a permanent priority value. However, a fixed priority scheme can result in a device, which has been assigned a low priority level, never being granted bus access.

By way of illustration FIG. 1 shows a device 10 coupled to a serial bus 11 via a distributed arbiter 12 for determining whether the device 10 should be granted bus access according to controller area network CAN arbitration protocol. The arbiter 12 includes an AND gate 13 that has one input coupled to the serial bus 11 and another input coupled to a register 14 that stores a device identifier code $p_i$ that is utilized as a priority level for the device 10. The output of the AND gate 13 is coupled to a set and reset trigger 15. The contents of the register 14 is shifted synchronously with the bus 11, where the contents of the bus 11 are compared with the contents of the register 14, such that if the bus 11 contains a dominate signal while the register 14 contains a recessive signal the AND gate sets the set and reset trigger 15 high causing the device 10 to loose arbitration, as is well known to a person skilled in the art. As such, if the bus is heavily utilized a device having a low priority level may not be able to gain bus access.

A floating priority scheme requires that priority values be reassigned to devices before an arbitration cycle. Accordingly, a floating priority scheme ensures that it is possible for any device connected to a bus to be allowed bus access within a desired time frame. However, most floating priority scheme implementations require dedicated wires for bus request and bus grant signals and thus are inappropriate for a single wire (i.e. twisted pair) serial bus.

It is desirable to improve this situation.

In accordance with a first aspect of the present invention there is provided an arbiter according to claim 1.

This provides the advantage of allowing a floating priority scheme to be implemented on a single wire serial bus.

In accordance with a second aspect of the present invention there is provided a distributed arbitration system according to claim 8.

In accordance with a third aspect of the present invention there is provided a method for determining a priority level for a node coupled to a serial bus according to claim 10.

An embodiment of the invention will now be described, by way of example, with reference to the drawings, of which:

Figure 1:
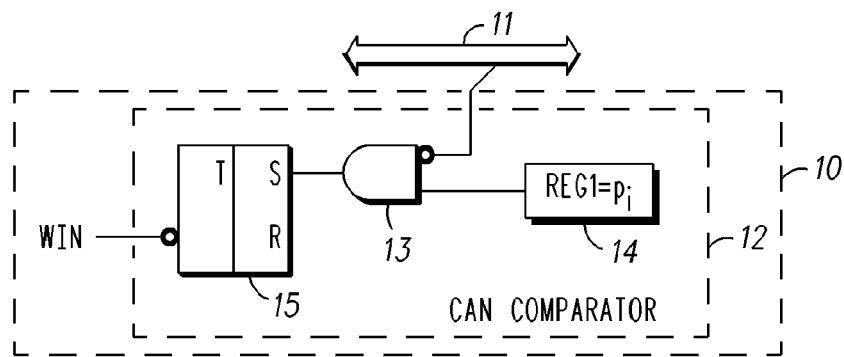
FIG. 1 illustrates a prior art device with a distributed arbiter.
Figure 2:
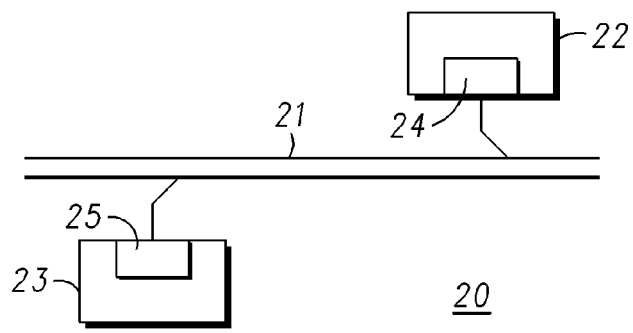
FIG. 2 illustrates a communication network according to an embodiment of the present invention.

FIG. 2 shows a communication network 20 having a serial bus 21 and two devices 22, 23, for example computer nodes, attached to the serial bus 21 via respective arbiters 24, 25, however as would be appreciated by a person skilled in the art any number of devices can be attached to the serial bus 21. For the purposes of this embodiment the communication network 20 is arranged to comply with the controller area network CAN standard (CAN Specification version 2.0).

Figure 3:
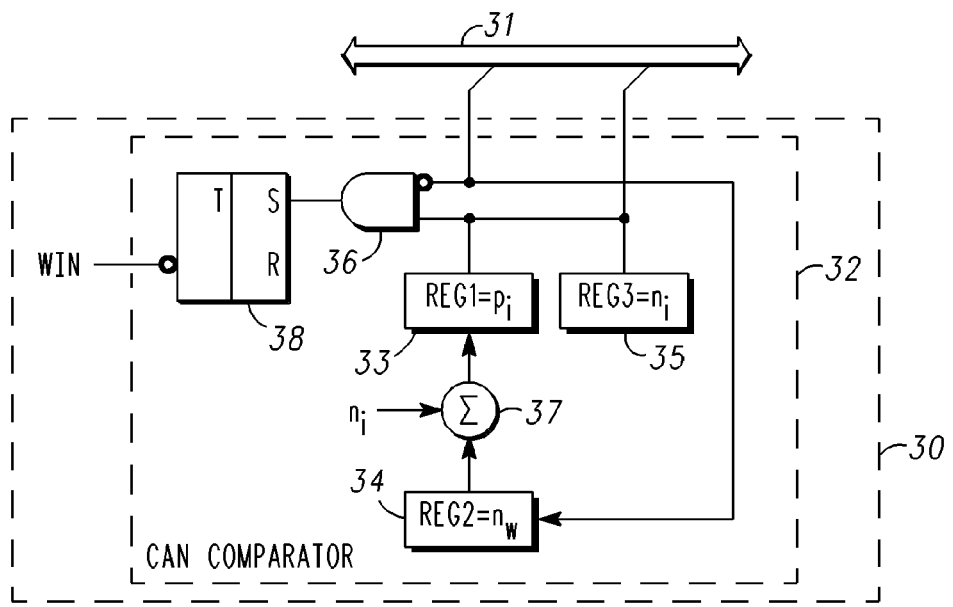
FIG. 3 illustrates a device with an arbiter according to a first embodiment of the present invention.

FIG. 3 show a single device 30, for example a computer node, coupled to a serial bus 31 via an arbiter 32. The arbiter 32 includes a first register 33, a second register 34, a third register 35, an AND gate 36, an adder 37 and a set and reset trigger 38.

The third register 35, which is arranged to store an identifier unique to the device 30, is coupled to the serial bus 31 and to a first input on the adder 37.

The second register 34, which is arranged to store an identifier associated with the last device (not shown) to have been granted access to the serial bus 31 as described below, is coupled to the serial bus 31, to a first input of the AND gate 36, and to a second input on the adder 37 where the second input of the adder 37 performs a NOT function on the received input.

An output of the adder 37 is coupled to an input of the first register 33, which is arranged to store a value that corresponds to a priority level for the device 30, as described below.

An output of the first register 33 is coupled to a second input of the AND gate 36.

An output of the AND gate 36 is coupled to an input of the set and reset trigger 38.

In accordance with the CAN standard the frame format for the serial bus 31 includes an arbitration phase followed by a data transmission phase for the device that wins arbitration and gains bus access.

The arbiter 32 described above is arranged to implement the controller area network CAN arbitration protocol (CAN Specification version 2.0) and determines a priority level for determining bus access for the device within a CAN, where data and control signals are transmitted over the serial bus that is represented by single wire (i.e. a twisted pair).

In accordance with the CAN standard a single bit is transmitted using two signal levels, where a zero represent a dominate value and a one represent a recessive value. During the arbitration process, where bus access is determined based upon a priority level associated with a device participating in the arbitration process, when more than one device is transmitting a value (i.e. part of the priority level associated with the device) onto the serial bus at the same time any device that is transmitting a dominant value is allow to continue transmitting and continue the arbitration process. If a device transmits a recessive bit and another device transmits a dominant bit the device transmitting the recessive bit looses arbitration and stops transmitting.

The arbiter 32 is arranged to implement a floating priority scheme where a priority level for the associated device 30 is determined based upon the identifier associated with the device 30 and an identifier associated with the device (not shown) that had been granted bus access in the previous bus cycle, as described below. The floating priority scheme is based upon the 'last-lowest' priority scheme, where the lowest priority level is assigned to the device (not shown) that was the winner of the previous arbitration cycle (i.e. the winner of bus arbitration for one bus cycle will be assigned with the lowest priority for the next bus cycle). However, other floating priority schemes could be implemented, for example identifiers associated with a device other than the last bus cycle winner could be transmitted on the bus.

During an arbitration cycle each device that is coupled to the serial bus, which requires communicating data on the bus, participates in the arbitration process where the device that has the highest priority level is granted bus access.

For the purposes of this embodiment the priority level for each device coupled to the serial bus is determined for each arbitration cycle by the following equation:

$$p_i=(n_i-n_w-1)_{modN}$$

Where $p_i$ is the priority level for the device 30, $n_i$ is the device identifier, $n_w$ is the identifier for the device (not shown) that was granted bus access in the previous bus arbitration cycle and N is the number of devices coupled to the serial bus, where the use of mod N is used to ensure that the value of $p_i$ is within the range of N devices.

An alternatively equation would be:

$$p_i=(n_w-n_i-1)_{modN} \text{(as described below)}$$

A method for determining a priority level for the device 30 will now be described.

Figure 4:
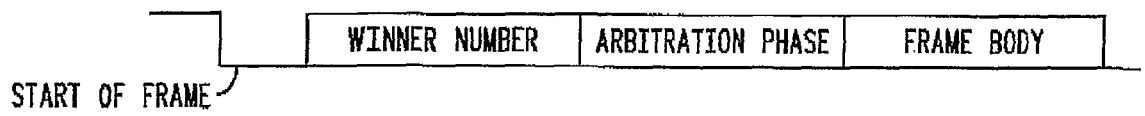
FIG. 4 illustrates an example of a bus frame format.

To allow the identifier $n_w$ for the device (not shown) that was granted bus access during the previous bus cycle to be loaded into the second register the device that was granted bus access in the previous cycle is arranged to transmit its unique identifier at the start of the next frame, prior to the start of the arbitration phase, as illustrated in FIG. 4. However, it would also be possible for the device identifier $n_w$ to be determined by other means, for example the identifier $n_w$ for the device that was granted bus access during the previous bus Cycle could be transmitted at the end of the bus cycle in which the device was granted bus access or each arbiter could be arranged to reconstruct the relevant device identifier, for example by setting the priority level pi to be equal to the device identifier $n_w$ for the first arbitration cycle.

Accordingly, once a bus request has been initiated and a start of frame has commenced the device (not shown) that was granted bus access during the previous bus cycle transmits from the third register of the relevant device the device identifier $n_w$ onto the serial bus, which is received by the other devices connected to the serial bus and placed in their respective second register 34.

To calculate the priority level $p_i$ for the device 30 the adder 37 adds the device identifier $n_i$ stored in the third register 35 with the NOT of the identifier $n_w$ for the device that had been granted bus access in the previous bus cycle. The calculated value is read into the first register 33 where the contents of this register are shifted synchronously with the bus 31 during the arbitration phase. If a dominate signal is being transmitted on the bus 31 during a period that corresponds to the first register 33 having a recessive bit the set and reset trigger 38 (e.g. a flip flop circuit) is set resulting in loss of arbitration for the device 30. However, if the calculated priority level $p_i$ for the device 30 is higher than the priority levels for the other devices requiring bus access the first register 33 will not have a recessive bit during a dominate transmission and correspondingly will not loose arbitration.

Figure 5:
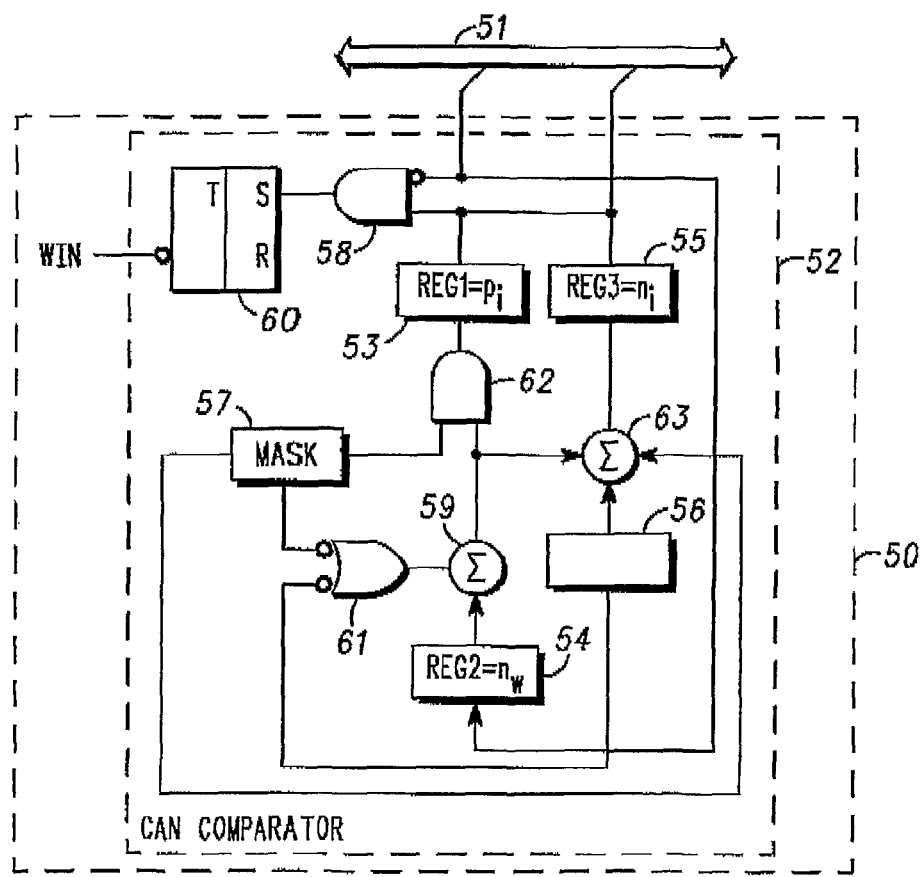
FIG. 5 illustrates a device with an arbiter according to a second embodiment of the present invention.

FIG. 5 shows an alternative embodiment of the device shown in FIG. 3 where the arbiter is arranged to use two or more identifiers, thereby allowing increased bus access for the device. Additionally, this embodiment allows some devices to have shorter message delivery latency.

FIG. 5 shows a device 50, for example a computer node, coupled to a serial bus 51 via an arbiter 52. The arbiter 52 includes a first register 53, a second register 54, a third register 55, a fourth register 56, a fifth register 57, a first AND gate 58, an adder 59, a set and reset trigger 60, an OR gate 61, a second AND gate 62 and a multiplexer 63.

The fourth register 56, which is arranged to store a master identifier $n_i$ unique to the device 50, is coupled to a first input on the multiplexer 63 and to a first input of the OR gate 61 where the first input of the OR gate 61 performs a NOT function on the received input.

The second register 54, which is arranged to store an identifier $n_w$ associated with the last device (not shown) to have been granted access to the serial bus 51, is coupled to the serial bus 51, to a first input of the first AND gate 58, and to a first input on the adder 59.

The fifth register 57, which is arranged to store a mask value, is coupled to a first input of the second AND gate 62, and a second input of the OR gate 61 where the second input of the OR gate 61 performs a NOT function on the received input and a third input on the multiplexer 63 (i.e. a control input) where the control input selects which data input to the multiplexer 63 is to be used (i.e. each bit of the mask value controls a separate bit of the multiplexer 63).

An output from the OR gate 61 is coupled to a second input of the adder 59. An output from the adder 59 is coupled to a second input of the multiplexer 63 and to a second input of the second AND gate 62. An output from the second AND gate 62 is coupled to an input of the first register 53, which is arranged to store a value that corresponds to a priority level $p_i$ for the device 50. An output from the multiplexer 63 is coupled to an input of the third register 55, which is arranged to store a selected identifier $n_i'$ for the device 50 that is used to determine a priority level for the device 50.

The arbiter 52 uses the mask value and the master identifier $n_i$ to generate a plurality of selected identifiers $n_i'$ unique to the device 50, where the arbiter 52 is able to use one of the plurality of selected identifiers $n_i'$ in every arbitration cycle.

The mask defines which bits of a generated identifier from one of the selected identifiers are common to all the other selected identifiers associated with the device 50 and those bits that are not. Low order bits in the mask are set to 1 and high order bits are set to 0. For example, if a single identifier is assigned to the device 50 all the mask bits will be set to 1 and if two identifiers are assigned to the device then the most significant bit of the mask will be set to 0.

The plurality of selected identifiers generated by the arbiter 52 differs from each other in the highest order bits. For example, if the arbiter 52 is arranged to generate two selected identifiers the difference between the two identifiers will be in the highest order bit only. If four selected identifiers are generated then the two highest order bits will differ between the four selected identifiers. This ensures that the selected identifiers are equally separated from each other.

For this embodiment, the priority level $p_i$ generated by the arbiter is derived from the equation:

$$p_i=(n_w-n_i'-1)_{mod N}$$

where $p_i$, and $n_w$ and $n_i$ have the same meaning as for the previous embodiment.

A method for determining a priority level for the device 50 will now be described with reference to an example using a selected identifier $n_i'$ for the device and an identifier $n_w$ for the device (not shown) that had bus access in the previous bus cycle.

A master identifier $n_i$ for the device 50 is determined and stored in the fourth register 56, for example $n_i$=0010. Then, depending on the required access to the bus, the number of additional identifiers $n_i'$ is determined, which is used to determine the mask value. For example if four identifiers $n_i'$ are required the mask would be set to 0011 to provide the selected identifiers 0010, 0110, 1010 and 1110 where the mask value is stored in the fifth register.

The identifier $n_w$ for the device (not shown) that had bus access for the previous bus cycle is received over the bus 51, as described above, which is stored in the second register 54, for example $n_w$=0001.

The first input and second input to the OR gate 61 provide an output of 1101, which is provided to the second input of the adder 59 and added with the identifier $n_w$. The adder allows two different operations to be performed, one on the low order bits where $p_i=(n_w-n_i'-1)_{mod N}$ is performed and another on the high order bits where $n'_{ih}=n_{wh}-1+c$ is performed where $n'_{ih}$ represents the higher order bits of $n_i'$, $n_{wh}$ represents the higher order bits of $n_w$ and c is the borrow from the lower order bit calculation according top $p_i=(n_w-n_i'-1)_{mod\ N}$. The output from the adder 59 (i.e. 1110) is provided to the second input of the second AND gate 62. The result of using the mask value and the output of the adder 59 as inputs to the second AND gate 62 is that the lower order bits of the output of the adder 59 are used to determine the priority level $p_i$ (e.g. for the adder output of 1110 and a mask value of 0011 the priority level will be 0010).

As a result of the mask input to the multiplexer 63, the multiplexer 63 uses the high order bits from the adder 59 (e.g. 11) and the low order bits from the master identifier (e.g. 01) to generate the selected identifier $n_i'$ that provides the priority level $p_i$ (e.g. 0010), which is loaded into the third register 55 for transmitting onto the serial bus 51 for providing $n_w$ for the next bus cycle.

The above embodiment describes an arbiter 52 that provides a floating priority level while being able to assign a plurality of identifiers to a device, however alternative embodiments could be utilized. For example, instead of the second register 54 feeding directly into the first input of the adder 59 the second register 54 could feed into the adder 59 via an exclusive or gate (not shown) with the mask value providing the second input value to the exclusive or gate. In this configuration the priority level equation would be similar to that used in the first embodiment (i.e. $p_i=(n_i'-n_w-1)_{mod N}$.

It will be apparent to those skilled in the art that the disclosed subject matter may be modified in numerous ways and may assume many embodiments other than the preferred forms specifically set out as described above, for example the above embodiments could be arranged such that other type of networks that use a serial bus for data and control signals could be used.

The invention claimed is:

1. An arbiter for a device arranged to be coupled to a serial bus, the arbiter comprising:
   a priority level calculator that obtains one or more respective identifiers associated with one or more other devices coupled to the serial bus;
   wherein the priority level calculator allocates a plurality of identifiers associated with the device, and determines a priority level based upon performing subtraction using a representation of the plurality of identifiers associated with the device and an identifier associated with one of the other devices that had previously been granted access to the serial bus;
   wherein the priority level calculator comprises an adder module;
   wherein the priority level calculator uses an output of the adder module and a mask in order to determine an identifier from the plurality of identifiers corresponding to the priority level;
   wherein the mask selects lower order bits of the output of the adder module and the priority level calculator uses the lower order bits selected in order to calculate the priority level.

2. An arbiter according to claim 1, wherein the priority level calculator is a receiver for receiving the identifier associated with one of the other devices over the serial bus.

3. An arbiter according to claim 1, wherein the received identifier information associated with one or more other devices coupled to the bus is transmitted at the beginning of a bus cycle in which the determined priority level is utilised to determine control of the serial bus.

4. An arbiter according to claim 1, wherein the priority level calculator is arranged to derive a second identifier from the identifier in order to allow a second priority level to be determined for the device.

5. An arbiter according to claim 1, wherein the serial bus is a single wire bus.

6. An arbiter according to claim 1, wherein the identifier from the plurality of identifiers associated with the device is derived from a master identifier associated with the device and the mask.

7. A distributed arbitration system comprising:
   a plurality of nodes coupled to a serial bus, wherein each node includes an arbiter having a priority level calculator that obtains an identifier associated with another node coupled to the serial bus;
   wherein the priority level calculator allocates a plurality of identifiers associated with the device, and determines a priority level based upon performing subtraction using a representation of the plurality of identifiers associated with the node and the identifier associated with one of the other nodes that had previously been granted access to the serial bus;
   wherein the priority level calculator comprises an adder module;
   wherein the priority level calculator uses an output of the adder module and a mask in order to determine an identifier from the plurality of identifiers corresponding to the priority level;
   wherein the mask selects lower order bits of the output of the adder module and the priority level calculator uses the is arranged to use lower order bits selected in order to calculate the priority level.

8. A distributed arbitration system according to claim 7, wherein the serial bus is a single wire bus.

9. A system according to claim 7, wherein the identifier from the plurality of identifiers associated with the device is derived from a master identifier associated with the device and the mask.

* * * * *